United States Patent Office 2,834,669
Patented May 13, 1958

2,834,669

PROCESS FOR DIRECT EXTRACTION OF A METAL FROM ITS SULPHIDE

Kenneth Pendar, Tangier, Morocco, assignor to Sesam S. A., Tangier, Morocco, a corporation No Drawing. Application April 9, 1954
Serial No. 422,236

Claims priority, application France April 18, 1953

6 Claims. (Cl. 75—77)

There has been already described a process for the direct extraction of a metal from its sulphide, consisting in melting the said sulphide, in presence of carbon, with a sulphide of an alkali metal and a metal oxide and/or reagents which produce them under the conditions in which the reaction is taking place.

The present invention has for its object to specify certain methods of application of this process. As a matter of fact, amongst the reagents susceptible of producing the alkali metal sulphide and the metal oxide, there has been mentioned an alkali carbonate combined eventually with zinc oxide and iron oxide. It has been ascertained that the alkali chlorides, though they belong to the general group of reagents considered in the known process, have advantageous properties which renders their use more specially commendable.

If, for example, sodium chloride is considered, it has been ascertained that it cannot become decomposed and transformed into sodium sulphide according to the mechanism which constitutes the object of the pending application Serial No. 317,349 of October 28, 1952, except in the presence of a metal oxide such as iron or zinc oxide or silica. In these conditions the sodium chloride, which is a cheap agent, plays the same part as the sodium carbonate in the reaction mentioned above, and in advantageous economical conditions since the sodium chloride is cheaper than the carbonate.

One might fear that the introduction of a chloride in the combination may produce a chlorinating action on the lead which would be uninteresting in view of the volatility of the lead chloride.

This, however, is not the case, since the reaction takes place in the presence of carbon, in consequence, in a smoothly reducing medium. Lead will always be transformed into a metal without chlorination.

Moreover, in the presence of sodium carbonate, the carbon will remove the lead from its chloride according to the following reaction:

$$PbCl_2 + CO_3Na_2 + 2C \rightarrow Pb + 2NaCl + 3CO$$

It appears therefore that the lead chloride formed would be continually decomposed and act as a kind of catalyst to reconstitute the sodium chloride at the initial sodium carbonate expense.

Finally tests have shown that the output of the direct extraction of lead on an industrial scale according to this method reaches 96%. This, in consequence, renders impossible any loss through chlorination and volatilisation of the lead.

However, in the absence of a metallic oxide, the sodium sulphide cannot be decomposed, contrarily to the sodium carbonate. This particularity does not however limit the field of utilization of this reagent, for it has been ascertained that the mere presence of the sodium chloride, mixed with the sodium sulphide, lowers the melting point of the slag and renders it more fluid, whence arises a supplementary economy in the cost of melting.

Finally, it might be objected that a sodium sulphate is a compound still cheaper than sodium chloride and that the choice of sodium chloride does not meet the economical requirements.

In reality, the sodium sulfate would produce large amounts of sulphur which would have to be fixed by an additional amount of metal oxide which is avoided with the chloride.

A particular embodiment of the invention will now be described, as applied to ores containing a small proportion of lead:

*Example 1*

To a lead concentrate containing:

| | Percent |
|---|---|
| Pb | 67.57 |
| $SiO_2$ | 1 |
| Fe | 1.1 |
| Zn | 6.6 |
| S | Rest | the following proportions (with respect to the lead ore) of reacting agents are added:

| | Percent |
|---|---|
| $CO_3Na_2$ | 10 |
| NaCl | 4 |
| Roasted pyrite at 64% Fe, under the form, almost exclusively of: | |
| $Fe_2O_3$ | 21.6 |
| C (0–2 mm.) | 5.6 |

The mixture is placed in a rotary kiln having a 2 m. diameter and 2 m. length, by loads of 1250 kg. of lead ore concentrate. It is submitted to a temperature of about 900°. The time of operation, from loading to unloading is 3 hours. This operation is repeated 5 times. An average of 97.6% of the contents of lead introduced is recovered.

*Example 2*

The operation is repeated with a lead ore concentrate having the following composition:

| | Percent |
|---|---|
| Pb | 63.20 |
| Zn | 6.1 |
| $SiO_2$ | 20.1 |
| Fe | 1.9 |

The recovery is then of 95.8%. Besides, the process applies indifferently to rich or poor ores, but it has been ascertained that it was specially advantageous to consider its application to ores that are not so rich in lead but which contain as impurities metals such as iron, zinc or copper and which, from the fact that they exist in the ore, need not to be added to the latter as reagent.

These metals form with the alkali salt a double sulphide under various conditions according to the form which they have in the ore. If these ores are sulphur compounds, they come under the principle of the known process. If they are oxidised, it suffices to mix some ore poor in lead with a rich ore containing sulphur for creating the necessary sulphur medium, without adding any metallic oxide since they contain some. In this manner, ores may be treated which contain in addition to lead a quantity which may attain 20% of other metals, such as zinc, copper, nickel, cobalt, ores which are very difficult to treat by the classical process, and the secondary metals of which are found entirely in the slag in much more concentrated proportions.

*Example 3*

The treatment of a mixed ore having the following composition may be mentioned:

| | Percent |
|---|---|
| Lead | 44 |
| Zinc | 18 |
| Silica | 5 |
| Lime | 3 |

In the ore considered in this example, these metals are in the form of carbonate. This ore is mixed with a rich sulphureted ore constituted by galena, in the following proportions:

| | Kg. |
|---|---|
| Galena | 600 |
| Mixed ores | 400 |
| Sodium carbonate | 170 |
| Coal | 80 |

After melting, at 700/800° C., the second metals are extracted from this slag after letching in order to eliminate the alkali salt by flotation. The complete mattes rich in lead, as well as the mixed ores, may be treated by this process.

It will be noticed that the proportions of the various reagents employed for carrying out the invention are not critical. It is sufficient simply that the total of the additional alkali reagent and metal oxide be at least sufficient for fixing the whole sulphur of the galena by liberating the lead. If this total quantity is less, a portion of the ore remains unchanged, which diminishes the yield.

Although the proportions of the reagents permit to carry out the reaction in a satisfactory manner, it has been noted that the lowest melting point is obtained when the whole of the reagent for the fixation of the sulphur is sodium carbonate.

From an economical point of view, however, it is not advantageous to adopt this procedure, as sodium carbonate is costly.

In practice, one is therefore led to seek an intermediate solution between the least melting point and the most advantageous cost price.

This solution consists in utilizing approximately 10% of sodium carbonate and 20-25% of iron oxide, this quantity depending somewhat on the nature of the ore. The results of trials have shown that, in these conditions, a yield of lead of 98% was obtained for the most advantageous cost price possible.

What I claim:

1. A method of extracting a metal from its sulfide, comprising the steps of melting lead sulfide in the presence of sodium carbonate, an oxide selected from the group consisting of zinc oxide, iron oxide, silica and lime, sodium chloride, and carbon, thereby causing reduction of said lead sulfide to the corresponding lead; and recovering the thus formed free lead.

2. A method of extracting a metal from its sulfide, comprising the steps of melting a mass containing lead sulfide and also containing at least one of the metals iron, zinc, copper, nickel and cobalt in the presence of sodium carbonate, an oxide selected from the group consisting of zinc oxide, iron oxide, silica and lime, sodium chloride, and carbon, thereby causing reduction of said lead sulfide to the corresponding lead; and recovering the thus formed free lead.

3. A method of extracting a metal from its sulfide, comprising the steps of melting a mass containing lead sulfide and also containing at least one of the metals iron, zinc, copper, nickel and cobalt in an amount up to 20% by weight of said mass in the presence of sodium carbonate, an oxide selected from the group consisting of zinc oxide, iron oxide, silica and lime, sodium chloride, and carbon, thereby causing reduction of said lead sulfide to the corresponding lead; and recovering the thus formed free lead.

4. A method of extracting a metal from its sulfide, comprising the steps of melting lead sulfide in the presence of sodium carbonate, an oxide selected from the group consisting of zinc oxide, iron oxide, silica and lime, sodium chloride in an amount between 5-10% by weight, and carbon, thereby causing reduction of said lead sulfide to the corresponding lead; and recovering the thus formed free lead.

5. A method according to claim 2 in which the total amount of said sodium compounds and said oxide is at least equal to the amount necessary to bind all of the sulfur of said mass.

6. A method of extracting a metal from its sulfide, comprising the steps of melting a mass containing lead sulfide and also containing at least one of the metals iron, zinc, copper, nickel and cobalt in the presence of sodium carbonate, an oxide selected from the group consisting of zinc oxide, iron oxide, silica and lime in an amount of about 20-25% by weight, sodium chloride in an amount of about 10% by weight, and carbon, thereby causing reduction of said lead sulfide to the corresponding lead; and recovering the thus formed free lead.

References Cited in the file of this patent

UNITED STATES PATENTS

| 821,330 | Betts | May 22, 1906 |
| 2,343,761 | Fleming | Mar. 7, 1944 |